Figure 1:
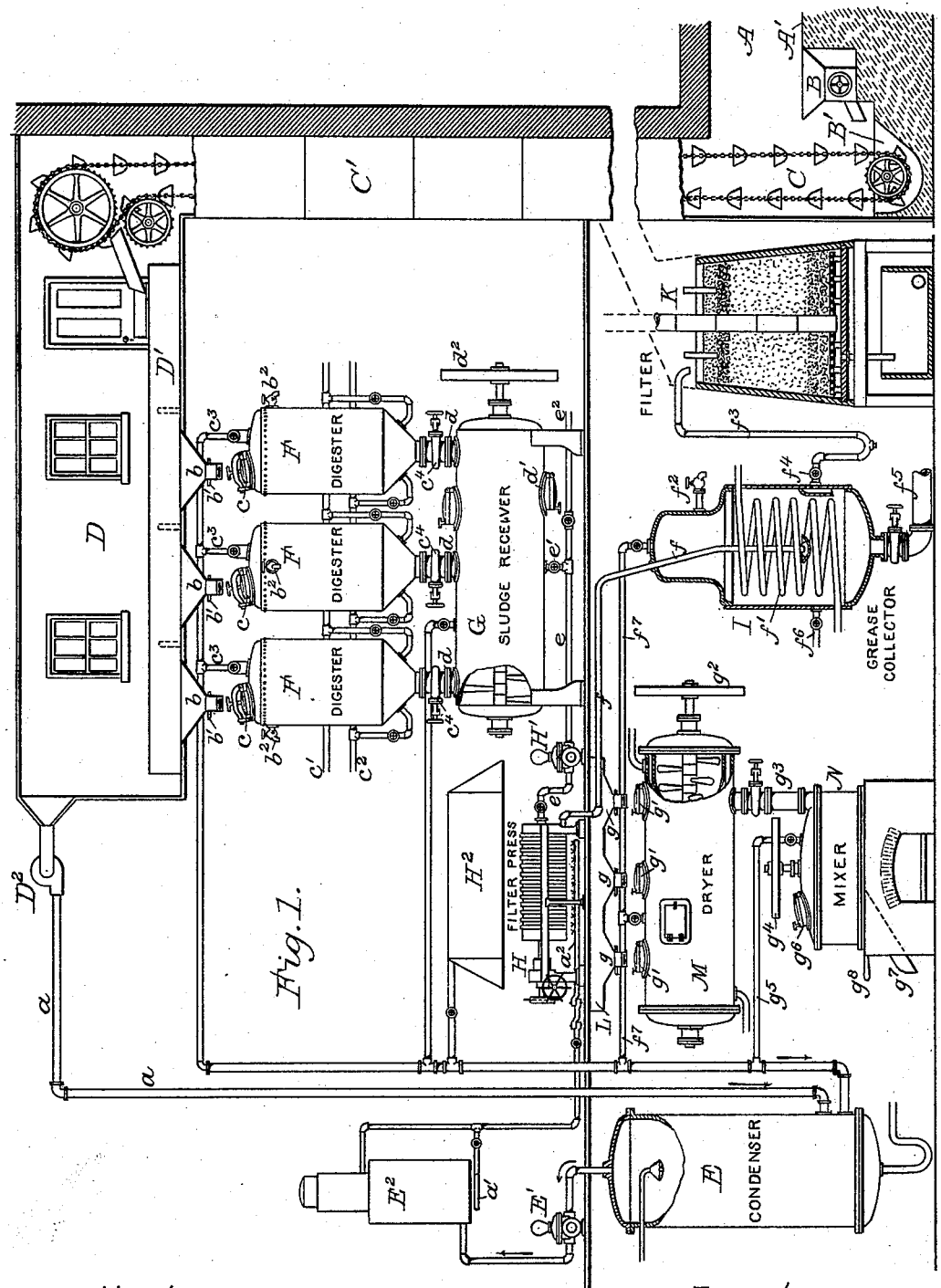

(No Model.) 2 Sheets—Sheet 1.

H. A. HOGEL.
PROCESS OF AND APPARATUS FOR MAKING FERTILIZERS.

No. 578,512. Patented Mar. 9, 1897.

Attest:
Howell Bartle
Emma E. Ward

Inventor:
Hascal Alfred Hogel
By Wm C. Ward
Attorney.

(No Model.) 2 Sheets—Sheet 2.

H. A. HOGEL.
PROCESS OF AND APPARATUS FOR MAKING FERTILIZERS.

No. 578,512. Patented Mar. 9, 1897.

Attest:
Lowell Bartle
Emma E. Marks

Inventor:
Hascal A. Hogel
By M. C. Wood
Attorney

UNITED STATES PATENT OFFICE.

HASCAL ALFRED HOGEL, OF PORT CHESTER, NEW YORK, ASSIGNOR OF ONE-FOURTH TO RUSSELL S. PENNIMAN AND JOHN C. SCHRADER, OF DOVER, NEW JERSEY.

PROCESS OF AND APPARATUS FOR MAKING FERTILIZERS.

SPECIFICATION forming part of Letters Patent No. 578,512, dated March 9, 1897.

Application filed December 4, 1895. Serial No. 570,982. (No model.)

*To all whom it may concern:*

Be it known that I, HASCAL ALFRED HOGEL, of Port Chester, in the county of Westchester and State of New York, have invented a certain new and useful Process of and Apparatus for Reducing and Utilizing City Garbage; and I do hereby declare that the following specification, taken in connection with the drawings furnished and forming a part of the same, is a full, clear, and complete description of the several features of my invention.

The object of my invention is to dispose of city garbage with due consideration of sanitary conditions and requirements and with that economy which accrues from a moderate use of fuel, few attendants, and the recovery of various ingredients in commercially-valuable forms.

The first essential step of my process consists in converting the garbage into a sludge (or well-liquefied and flowable condition) by the digesting action of hot water and steam under pressure. This step may be shortened in the matter of time when preceded by mechanically grinding or macerating the garbage as an aid to or for facilitating the digesting operation. This maceration is preferably conducted in the presence of the normal liquids of the garbage, so that the solid matters may take up and carry them as fully as may be practicable.

The second essential step of my process consists in the forced filtration of the sludge while hot and under heavy pumping-pressure (as in a filter-press) for separating the solid matter from the oil, grease, and waste liquid. As an aid to filtration earthy matter, such as powdered phosphates in small quantities, may be combined with the sludge, said phosphates being also of value in the recovered solid matter when used as a fertilizer.

These two main steps constitute a complete operation, so far as relates to the reduction of the garbage into two parts or conditions, the one being solid and the other liquid, and in their subsequent treatment each must be separately controlled and with a view to the respective ends sought—viz., the utilization of the solid matter in producing commercial fertilizers and in the recovery of the grease from the filtered liquids—the operations on the solids and liquids being capable of being carried on simultaneously by my process. The recovery and utilization of the solid matters, therefore, involves the aforesaid two essential steps, succeeded by the following successive steps: washing said solid matter with hot water for two purposes—viz., removing offensive odors, on sanitary grounds, and also for carrying off such grease as might still remain and which would be objectionable in any fertilizer—then drying said solid matter, then mixing the same with such acids, alkalies, and phosphates as might be required for producing such particular forms of fertilizers as would be specially suited for particular crops.

The recovery of oil and grease from the liquid matter discharged from the filter-press may be considered as a third step succeeding the two main steps, having reference, first, to the reduction of the garbage to a solid form having in itself commercial value as an article of sale to fertilizer-manufacturers, and, secondly, to the economic recovery of grease products; but when considered as operations which are carried on simultaneously, as in my complete process, the recovery of the grease and the conversion of the solid matter into fertilizing compounds might be considered as a single step succeeding the second main step.

Having reference solely to sanitary ends, and also for rendering the working of the process inoffensive, nearly all of the work is carried on in closed or closable chambers and receptacles, and the effluvia, steam, and gases are withdrawn, kept under control, and rendered inoffensive, and so far as may be practicable the gases are carbureted and made fit for burning, so as to afford or contribute to securing desired heat required in working the process.

As another sanitary measure the residual waste liduid, containing more or less offensive matter, is discharged into filters, through which it passes by gravitation, and the effluent water emerges in fit condition for discharge into ordinary sewers or into open gutters or into adjacent rivers or streams.

Although apparatus varied in form and arrangement may be employed without departure from the main features of my invention, I have devised an organization or plant well suited for my purposes and which embodies various novel features in the construction and arrangement of the several parts thereof with a view to sanitary, effective, and economical operation, and said apparatus is illustrated in the drawings.

Figure 2:
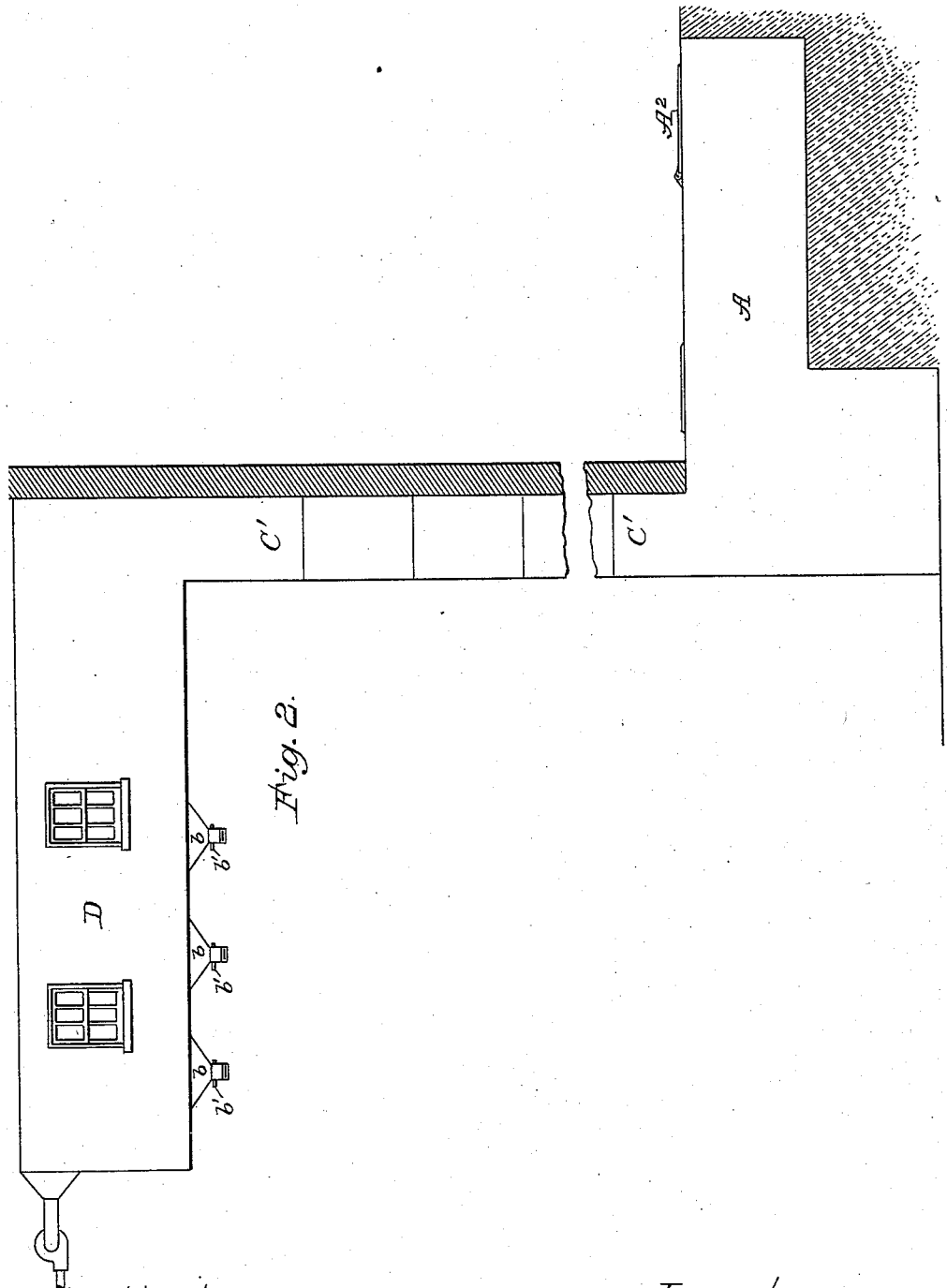

Figure 1 illustrates my complete apparatus in what I deem its best form. Fig. 2 illustrates in side elevation the garbage-receiving chamber and the elevated chamber from which the garbage is delivered.

It is obviously important for sanitary purposes that an effective control of offensive vapors should be exercised from the moment the garbage is delivered at the works by the collecting-carts, and that the initial receiving-chamber should be closable but readily accessible for the prompt reception of the garbage.

In my apparatus the receiving-chamber A is, whenever practicable, located below an available surface grade, so as to afford a wagon-way above it and enable the contents of garbage-carts to be dumped promptly through suitable openings provided with close-fitting hinged covers. Such a subway-chamber will generally afford fairly low temperatures and obviate an undue development of offensive vapors even in warm weather. In this chamber, which would be suitably lighted, as by dead lights or lamps, the garbage is to be culled by workmen sufficiently for the removal of such solid matter as bottles, cans, and crockery and for the recovery of lost spoons, forks, &c., all of which are to be placed in suitable receptacles and appropriately disinfected.

The platform at A' is intended to so confine or retain the liquid matter common to city garbage that it with the bulk of the garbage may pass to or be fed into a suitable grinding-mill or macerator B, the liquid enabling the mill to better perform the grinding or macerating operation. The macerator delivers its mushy product to a receptacle or basin at B', wherein the foot of an endless chain and bucket elevator C is located for conveying the macerated garbage to an elevated charging-chamber D and into a charging-tank D'. Although the entire apparatus is to be under cover in a suitable building, this chamber D has tight walls, suitable means for lighting it, and is accessible to attendants by way of a close-fitting door. The elevator is inclosed by a suitable casing C', which is open at the bottom in communication with the receiving-chamber and at the top where it enters the charging-chamber. An exhaust-fan $D^2$ is relied upon for maintaining a continuous outward flow of air from the charging-chamber as well as from the receiving-chamber, an upward circulation of air being induced in the casing of the elevator, so that the air and offensive vapors thus withdrawn are kept under control and conducted within a suitable pipe $a$ to the portions of the apparatus which dispose of the vapors. A condenser E is here employed, having an interior nozzle affording a spraying water-jet. By way of a suitable trapped pipe the injected water passes from the condenser to a sewer. The air and vapors are withdrawn by a suitable pumping or exhausting apparatus at E' and delivered to a carbureter $E^2$, where the air and vapors are so charged with volatile hydrocarbons as to afford a combustible mixture, a portion of which is usefully employed for heating the carbureter, as at $a'$, and other portions thereof are used for heating other parts of the apparatus, as will be hereinafter indicated.

I deem the described organization and arrangement of a closed or closable receiving-chamber, an upper closed charging-chamber, the cased elevator, means for exhausting air and offensive vapors, and their combustion to be a valuable sanitary feature in a garbage-working plant, regardless of what may be done with the garbage after it has been delivered into the charging-chamber. When in proper operation, the opening of a trap-door or other receiving-aperture at the receiving-chamber would not involve an outward flow of stench, because of the constant upward draft in the casing of the elevator, and at all times there would be little or no tendency for offensive vapors to pass outwardly from any of the controlled spaces. It will always be of consequence to have the garbage so elevated as to enable gravitation to be employed during the several steps in reducing operations.

The charging-tank D' is provided with pendent delivery-funnels $b$, of which three are here shown, each having a suitable gate $b'$, and preferably provided with a flexible sleeve, (not shown,) so that the garbage may without much escape of vapor be delivered promptly into the three digesters F F F by way of their charging-ports $c$. As it is always important that the digesters should not be too fully charged, it is advisable that the funnels $b$ be accompanied within the tank with vertical side walls affording a cubic space, which, with that of the funnels, will enable the measuring of proper charges before opening the gates $b'$.

Near the top each digester has a cock $b^2$, which, after charging with garbage and closing the digester, serves as a gage-cock for avoiding an undue supply of hot water to the digester, and in the event of a charge of garbage being specially "fat" some of the grease might be removed by way of said cock.

The charging-ports $c$ of the digesters are provided with suitable covers, having clamps and gaskets for assuring steam-tight closure, and the digesters are strong metallic vessels, capable of sustaining heavy steam-pressures, and although not so shown they are preferably steam-jacketed, high heat and considerable pressure being needed for enabling the conversions of their contents into a "sludgy" condition as rapidly as may be possible, say in from four to eight hours. The digester steam-pipes and water-pipes are shown at $c'$ and $c^2$, they, as illustrated, being so arranged and so provided with cocks that the interior of the digesters may be separately supplied with steam or hot water, or both. At the top of each digester there is a vent-pipe $c^3$, which communicates with the condenser E, said pipe having a suitable cock, and at its connection with the digester also having an inclosed spring-controlled valve of the safety type, which will open under undue pressure of steam.

Each digester has a discharge-aperture at its base, provided with a tightly-closing gate $c^4$, through which the sludge is delivered by way of a pipe and port $d$ into an underlying sludge-receiver G, this latter having a capacity sufficient to at least receive the contents of one or two of the digesters at a time, so that the several digesters may be consecutively worked and each discharged after an appropriate period of working.

If at any time the discharged contents of a digester should seem to require additional hot water, it can readily be supplied to the sludge-receiver by way of an emptied digester, or a special water-supply pipe may be provided for the receiver.

The sludge-receiver G has a manhole $d'$ and close cover at its lower side for affording occasional access and the removal of such solid masses of matter as may not readily be withdrawn with the liquid sludge. Within said receiver there is a horizontal shaft carrying radial arms or stirrers and having a driving-pulley at $d^2$, so that the sludge may be kept in a state of agitation, prevented from settling, and maintained in a fit condition for delivery to one or more so-called "filter-presses," as at H.

The filter-press here shown is of a well-known type, and the sludge is forcibly delivered thereto under pressure, sometimes as high as two hundred pounds to the inch, by means of a suitable pump H', connected by suitable pipes, as at $e$, respectively, with the press and the sludge-receiver G. A gate or cock at $e'$ enables the delivery of sludge to the pump to be cut off at intervals and also enables the pump to then receive hot water by way of the pipe extension $e^2$, and from time to time to force it through such masses of solid matter as may have accumulated within the filter-press. For facilitating the filtering operation a small quantity of finely-ground earthy matter which is insoluble in water is introduced with the sludge into the receiver G; say to each hundred pounds of sludge add from two to five pounds of the insoluble matter, which should be selected with due reference to its value as a fertilizing ingredient, as, for instance, phosphatic rock, waste bone-charcoal, or fine bone-meal, either of which will serve to keep the separate masses or "cakes" in the filter in a desirably open or porous condition. The operation of the pump under suitably heavy pressure and with the sludge in a properly-heated condition will cause such matter as is carried in suspension to be separated from the liquid matter, this latter including a greater portion of the grease, and such small quantities of the latter as might have been retained in the cake are removed, or practically so, during the hot-water injection. For maintaining the press at a desirable temperature steam-pipes may be employed, but I prefer to employ adjacent gas-burners, as at $a^2$, supplied from the carbureter $E^2$, already described.

During the operation of the filter-press the combined waste liquid and grease slowly exudes, is received into a pipe $f$, and delivered thereby into a grease-collector I, the terminal of said pipe being located centrally or sufficiently near the bottom of the collector as to prevent the inflow from unduly agitating the liquid already deposited in the collector. A steam-coil $f'$ within the collector enables the mass to be maintained (without ebullition) at such a temperature as will be favorable to the rising of the greasy and oily matter to the surface of the liquid and adjacent to the top of the collector, which has a reduced sectional area or "dome" for favorably massing the oil or grease, so that it may be drawn off by way of the cock $f^2$. The waste liquid passes from near the bottom of the grease-collector, by way of the pipe $f^3$, upwardly and is then discharged into one or more suitable filters, one being shown at K, from which the effluent water will flow in a condition warranting its free discharge into any available sewer or stream without violation of the usual sanitary obligations. This grease-collector thus organized can be operated either continuously or intermittingly, as may be desired. The upward extension of the pipe $f^3$ terminates at such a level as will always assure the maintenance of the contents of the collector at a level above the grease-cock, and the grease-line may at will be temporarily elevated by a brief closure of the cock $f^4$ in the pipe $f^3$.

The collector has at its base a pipe $f^5$, provided with a suitable gate or cock for enabling the collector to be cleared or flushed whenever desirable, and it has also a pipe $f^6$ entering at its side for the delivery of water for flushing purposes. A pipe $f^7$ connects the collector with the condenser E for taking away offensive vapors.

The filter K, as shown in dotted lines, is provided with a cover or hood in communication with the trunk or casing of the elevator, thus controlling such offensive vapors as may be evolved. The waste waters delivered to the filter K would preferably be first discharged upon a mass of powdered phosphate located at the top of the filter, and portions of said phosphate could then be removed from time to time and mixed with the original garbage for conveyance to the charging-tank, but the desirability of utilizing filterable components of said waste waters would depend upon whether or not their analysis should indicate the presence of sufficiently valuable fertilizing constituents to warrant attempting their preservation.

Having thus followed the liquid matters, I will now return to the solid matter separated and retained by the filter-press H. As usual in ordinary filter-press operations, the several press-plates are readily separated and the cake dropped or dislodged downwardly from the spaces in which it was formed. The underlying gas-burner pipe, being flexibly jointed, is swung to one side out of the way of the falling cake. Such effluvia as would naturally be evolved during this cake-discharging operation is well disposed of by way of an overhanging hood $H^2$, which communicates with the condenser by way of a closable or gated pipe. The heat from the press, as well as from the gas-burners at $a^2$, will assure the prompt upward passage of air and vapor from the press into the custody of the hood, from which it will pass to the condenser, the gate or valve being always opened during the clearing of the press. The hood would have its full equivalent in a tightly-closable compartment, which would be specially desirable in cold weather, it being of importance to maintain the filter-press at such a high temperature as will enable the greases to pass freely through the solid cake matter and out with the waste liquid.

The cake when dislodged is dropped into a receptacle L, having several discharging-ports provided with gates, as at $g$, located above charging-ports $g'$ in the top of a "steam-jacketed" drier M, said ports having tightly-closable covers. The drier is also connected with the vapor-pipe $f^7$, which communicates with the condenser E. Within the drier is a horizontal shaft having radial arms and stirrers revolved by power applied to the shaft-pulley $g^2$.

After a charge of cake has been properly dried and finely broken up by the stirrers it is discharged by way of a closable or gated pipe or duct $g^3$ into the mixer N, wherein it is combined in desired proportions with any materials suited for fertilizers, as, for instance, phosphates, either bone or mineral, and whether these have been previously treated with acid or not, but it is my purpose to have the mixer constructed of such material or so lined as to enable it to operate on acid mixtures without undue destructive effects, and also to provide the mixer with means for heating it and drying the mixtures, as by a furnace, as indicated, or by steam heat.

The mixer is provided with stirrers in a well-known form carried by a vertical shaft and actuated by means of a gear or a pulley $g^4$. The vapors evolved during the mixing operation are controlled by a suitable cover and a pipe $g^5$, communicating with the condenser E. A properly-covered manhole at $g^6$ in the cover affords access to the interior of the mixer, and the finished product is discharged downwardly through a spout $g^7$ upon the opening of a gate $g^8$, the stirrers facilitating delivery.

The apparatus being housed within a tightly-closable but properly-lighted building, the small quantities of offensive vapor which might escape from the several portions of the apparatus would be practically controlled by means of one or more exhaust-fans located in various portions of the building and arranged to deliver their blasts into the steam-boiler furnaces or their smoke-stacks.

It will be obvious that the employment of chemical agents (such as acids and alkalies) in the digesters with the garbage would involve no departure from my invention, although I deem it advisable to avoid the use of such acids as would operate destructively upon the various portions of the apparatus.

Having thus described the apparatus as devised by me and indicated its operation in the working of my process, I claim as new and desire to secure by Letters Patent—

1. The process of treating city garbage, which consists in reducing the garbage to a sludgy or liquefied condition by the digesting action of hot water and steam under pressure, and then separating the grease and other flowable or fluid matters from the solid constituents of the sludge, by the direct and forced filtration of the liquefied sludge while well heated and the sludge being under heavy pumping-pressure, substantially as described.

2. The process of treating city garbage, which consists in reducing the garbage to a sludgy or liquefied condition by the digesting action of hot water and steam under pressure; then separating the solid matter from the sludge while in its normal liquefied condition and well heated, by forcible filtration of the sludge, and thereby expelling the water and grease, and then forcing hot water through the solid matter, for relieving it from offensive odors and also from such greasy matter as might be left therein, substantially as described.

3. The process of treating and utilizing city garbage, which consists in reducing the garbage to a sludgy or liquefied condition; then while the sludge is well heated separating the solid from the liquid matter, by the forcible filtration of the liquefied sludge, for expelling with the waste fluids such grease as would impair the solid matter for use in fertilizers; then drying said solid matter, and then mixing the same with suitable powdered phosphatic fertilizing ingredients and converting the mass into a dry and finely-powdered condition, substantially as described.

4. The process of treating city garbage, which consists in reducing the garbage to a sludgy or liquefied condition; then while the liquid sludge is well heated separating the solid matter from the liquid constituents of the sludge by the forcible filtration of the liquid sludge, and then separating and removing grease from the filtered liquid, substantially as described.

5. In a garbage-reduction plant the combination with a tightly-closable chamber for the initial reception of garbage, as from wagons or carts, of an elevated tightly-closable chamber and one or more underlying digesters to which the garbage may be delivered by gravitation; an endless chain and bucket elevator extending from the lower chamber to the upper; a casing inclosing said elevator and affording an air or vapor duct from the lower chamber, to said upper chamber; means for exhausting air and offensive vapors from said inclosed spaces by way of the upper chamber, and means for disposing of said vapors by combustion, substantially as described.

6. In a garbage-reduction apparatus, the combination with one or more digesters for reducing garbage to a sludgy condition, of a closable sludge-receiver G provided with means for agitating its contents; a filter-press; a forcing-pump connected by a pipe respectively with said press and receiver, and a vessel provided with a cock near its top and serving as a grease-collector receiving the liquid matter from said press by way of a conducting-pipe, and separating the grease from said liquid, substantially as described.

7. In a garbage-reduction apparatus, the combination with a grease-collecting chamber, of a feeding pipe or duct terminating and discharging centrally within the chamber; means for heating the contents of said chamber; a discharge-cock near the top of said chamber for drawing off the grease; a waste-discharge pipe leading from near the bottom of the chamber outside and upwardly to the desired grease-line level within the chamber, and thence to its point of discharge, substantially as described.

8. In a garbage-reduction apparatus, the combination substantially as described, of a filter-press and its forcing-pump, a vapor-collecting hood over the press, an underlying trough provided with one or more gated discharge-ports, a drier provided with means for heating it, and having suitable stirrers, and receiving-ports having tight covers, a fertilizer-mixer below the drier, communicating therewith by way of a gated duct or pipe, and provided with a stirrer, and means for heating its contents for drying the said drier and mixer being closable during their operation, and connected with means for disposing of the offensive vapors evolved from the mixer and the drier, and from the press during the discharge of its solid contents.

HASCAL ALFRED HOGEL.

Witnesses:
JOSEPH B. BRAMAN,
HAL BELL.